May 26, 1936.  L. O. HANSON  2,041,924
HEDGE TRIMMER
Original Filed June 22, 1934

Inventor
Louis O. Hanson,
By Geo. C. Kennedy.
Attorney

Patented May 26, 1936

2,041,924

UNITED STATES PATENT OFFICE 2,041,924

HEDGE TRIMMER

Louis O. Hanson, Waterloo, Iowa, assignor of one-half to Hans T. Borsheim, Waterloo, Iowa Application June 22, 1934, Serial No. 731,810
Renewed October 18, 1935

4 Claims. (Cl. 30—11)

My invention relates to improvements in devices for trimming or grooming hedges or other vegetation, and an object of my improvements is to supply a convenient portable mechanism of this class of simple and inexpensive construction, for rapid and effective operation while in use.

Another object of my improvements is to include in the mechanism of the device a rotary blade with means for driving it at high speed, and having an especially contrived and shaped form wherein the terminal cutting edges are fashioned for the most effective work for various purposes.

Another object of my improvements is to provide this appliance with a combined shield and deflecting member for protecting the operator from flying detached twigs, and for directing such separated parts to a distance from the vegetation being trimmed or eliminated.

Figure 1:
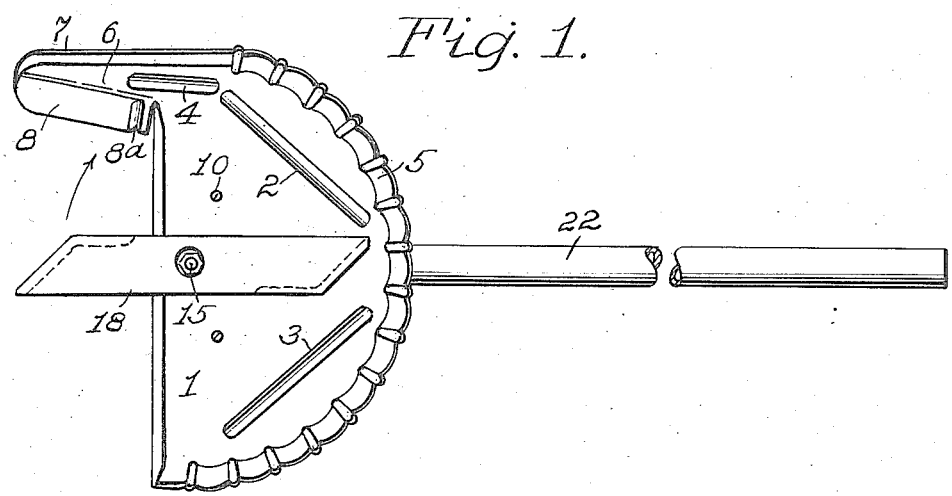
Figure 2:
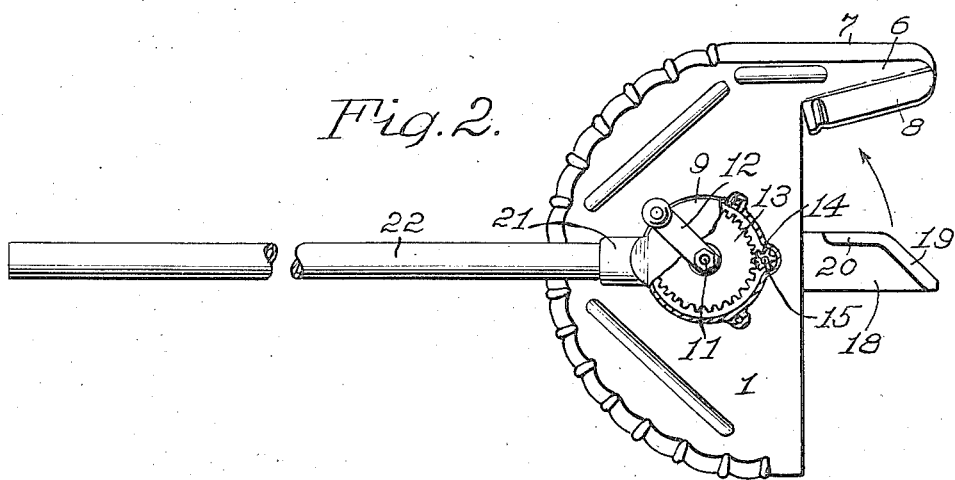
Figure 3:
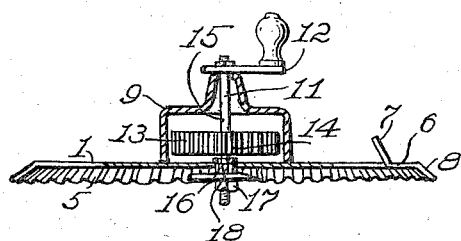

I have accomplished all these objects by a successful reduction to practice by the means which are hereinafter described and claimed, and which are illustrated in the accompanying drawing, in which Figs. 1 and 2 are plan views of opposite faces of my invention, with a portion of the handle broken away. Fig. 3 is a front elevation of the device, with parts in transverse section.

My device comprises an elongated handle 22, a substantially planar guard and director shield 1 fixedly mounted thereon, and rotary cutting means positioned upon the shield with means for rotating it at a relatively high speed.

The shield 1 has its rear part of semicircular shape with a dished fluted flange or deflector wall 5 on one face around the single rotary blade 18 being a parallelogram with oblique ends, which ends and portions of the conterminous lengths thereof are the cutting edges, for opposite parts of the blade, the blade being medially fixedly mounted on one end of a shaft 15 between an annulus 16 thereon and an end nut 17, as shown in Fig. 3. This shaft 15 extends through an aperture in the shield 1 axially relative to the dished rim 5 and carries on the opposite side of the shield a small pinion 14 of the spur type in mesh with a larger spur gear 13 rotatably mounted on said shield.

The numeral 9 denotes a gear-housing mounted upon the opposite face of the shield 1 from the blade 18 and secured removably thereto as by screws 10. Above the housing 9 a handled crank 12 is mounted on the shaft 11 which carries the gear wheel 13. Both of said shafts 11 and 15 have bearings not shown for their ends in said housing, as also in said shield. The blade 18 having its cutting edge parts carried about an obtuse angle with short curvilinear joining part, exercises a continuously drawing cut while in rotation, which is more effective in prolongation of the cutting because of the change in direction of its edge, as is evident when one considers the fact that the sloping end of the blade has a following effect upon twigs being cut during the rotation of the blade, than could be the case with a straight edged blade where the follow up is quicker and therefore reaches fewer twigs in its course.

Referring to the shield 1, it is preferably reinforced or stiffened by short crimps or depressed parts at 2, 3, and 4 positioned at favorable angles at places thereon, and the shield has at one side a forwardly projected guide part 6 which has obliquely directed oppositely positioned rims or deflectors 7 and 8, which, with the crimped or fluted oblique and semicircular rim 5 in the rear serve together to oppose and deflect pieces or twigs of a hedge being trimmed downwardly and laterally, keeping them from striking the operator, while projecting them to a sufficient distance to one side of the hedge for suitable clearance. The housing 9 has a socket 21 to seat the handle 22. The guide 6 has its inner oblique part 8 preferably inclined inwardly to be more effective in drawing gathered twigs toward the advancing blade 18.

My device may be made of any size desired, and its blade 18 may be of another shape which will preserve the advantage mentioned of prolonging the cutting to reach more twigs at a time, while the blade may be given a high speed of rotation by any other mechanically equivalent operating means or by actuation of a motor.

I claim:

1. In a device of the character described, a supporting device including a handle and a shield mounted thereon, and a rotatable blade device mounted on the shield, the shield having at one side a forwardly projecting guide with an oblique deflecting projection spaced from the blade and slanting inwardly to draw material being cut toward the blade.

2. In a device of the character described, a supporting device including a crimped dished rim around it except at the front and having a forwardly projecting guide and deflector, the guide having a middle part on a level with the supporting device with obliquely offset inner and outer side curtain rims.

3. In a device of the character described, a supporting device of planar shape with its face on its following part at one side inclined obtusely from that face as deflecting means, and a blade rotatably mounted on the supporting means in advance of such deflecting means, the deflecting means and device having a forwardly extending guide finger at one side in advance of the deflecting means, whereby both protect the operator from flying fragments and also divert such fragments laterally beyond the material to be cut.

4. In a device of the character described, a supporting planar device having a high-speed rotary blade mounted centrally on one face thereof, means for rotating said blade, said planar device having a raised semicircular rim about its rear part facing the operator and at its opposite part a forwardly projecting guide and inwardly slanting deflector finger, and said blade having a cutting edge made up of angularly directed parts meeting at an obtuse angle for causing a prolonged abruptly changed drawing cut on material to be sheared.

LOUIS O. HANSON.